(12) United States Patent
Choi et al.

(10) Patent No.: US 10,107,888 B1
(45) Date of Patent: Oct. 23, 2018

(54) VEHICLE STATUS MONITORING SYSTEM AND VEHICLE

(71) Applicants: Hyundai Motor Company, Seoul (KR); Kia Motors Corporation, Seoul (KR)

(72) Inventors: Kyoung Hyouck Choi, Incheon (KR); Yunjoong Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/823,439

(22) Filed: Nov. 27, 2017

(30) Foreign Application Priority Data

Jul. 28, 2017 (KR) .......................... 10-2017-0096021

(51) Int. Cl.
| | |
|---|---|
| *G08B 1/08* | (2006.01) |
| *G01S 5/00* | (2006.01) |
| *B60Q 1/32* | (2006.01) |
| *G06F 21/43* | (2013.01) |
| *H04L 29/06* | (2006.01) |
| *G08G 1/16* | (2006.01) |

(52) U.S. Cl.
CPC ............ *G01S 5/0027* (2013.01); *B60Q 1/323* (2013.01); *G06F 21/43* (2013.01); *H04L 63/0492* (2013.01); *G08G 1/161* (2013.01); *H04L 63/0823* (2013.01)

(58) Field of Classification Search
CPC ........ G01S 5/0027; G08G 1/161; G07C 5/008
USPC .................................................. 340/539.22
See application file for complete search history.

(56) References Cited

U.S. PATENT DOCUMENTS

| | | | |
|---|---|---|---|
| 7,623,949 B2 * | 11/2009 | Nou ....................... | G07C 5/008 340/539.13 |
| 9,457,689 B2 | 10/2016 | Stefan et al. | |
| 9,526,076 B1 * | 12/2016 | Park ..................... | H04W 84/14 |
| 9,604,571 B1 | 3/2017 | Kurtovic | |
| 9,872,254 B2 * | 1/2018 | Pandya ............. | H04W 52/0261 |
| 2007/0088473 A1 * | 4/2007 | Moon .................... | G07C 5/008 701/36 |
| 2012/0194356 A1 | 8/2012 | Haines et al. | |
| 2012/0243528 A1 | 9/2012 | Frye et al. | |
| 2012/0254960 A1 | 10/2012 | Lortz et al. | |
| 2013/0257604 A1 | 10/2013 | Mirle et al. | |
| 2014/0343834 A1 | 11/2014 | DeMerchant et al. | |

FOREIGN PATENT DOCUMENTS

| | | | |
|---|---|---|---|
| KR | 10-1518853 B1 | | 5/2015 |
| KR | 10-1525704 B1 | | 6/2015 |
| KR | 10-1540102 B1 | | 7/2015 |
| WO | WO 2016/154674 A1 | | 10/2016 |

* cited by examiner

*Primary Examiner* — John A Tweel, Jr.
(74) *Attorney, Agent, or Firm* — Morgan, Lewis & Bockius LLP

(57) ABSTRACT

A vehicle may include an integrated electronic control unit (ECU) outputting a sleep indicator signal when a plurality of electronic control units (ECUs) is switched to a sleep status, and switching to a wake-up status according to a request of a telematics terminal, collecting vehicle status information and returning the vehicle status information; and the telematics terminal requesting vehicle status information by transmitting an alive request signal when the sleep indicator signal occurs by monitoring the integrated ECU, and outputting the returned vehicle status information.

20 Claims, 8 Drawing Sheets

VEHICLE STATUS MONITORING SYSTEM AND VEHICLE

CROSS-REFERENCE TO RELATED APPLICATION(S)

The present application claims priority to Korean Patent Application No. 10-2017-0096021, filed on Jul. 28, 2017, the entire contents of which is incorporated herein for all purposes by this reference.

BACKGROUND OF THE INVENTION

Field of the Invention

The present invention relates to a vehicle status monitoring system and a vehicle.

Description of Related Art

A variety of vehicle additional service devices have been developed and used in a vehicle in consideration with user convenience and safety.

For example, the vehicle additional service device may include a vehicle safety device, e.g., lane departure warning system to maintain a vehicle within a driving lane by assisting a steering wheel operation of a driver when the vehicle travels on a road, and an additional service provider, e.g., a telematics terminal providing a navigation function configured to guide a route to a destination and information related to the route to the destination which is selected by a driver.

Furthermore, an operator may provide a service to a user to verify the vehicle status using a mobile communication terminal belonging to the user, to improve the user convenience.

However, the service is applied in a way that the vehicle status information is checked and then the service is provided, and thus it may cause the time delay when providing the vehicle status information to the user.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Therefore, various aspects of the present invention are directed to providing a vehicle status monitoring system and a vehicle configured for improving the quality of the vehicle status provision service by actively collecting and managing vehicle status information.

Additional aspects of the present invention will be set forth in part in the description which follows and, in part, will be obvious from the description, or may be learned by practice of the present invention.

In accordance with one aspect of the present invention, a vehicle may include an integrated electronic control unit (ECU) outputting a sleep indicator signal when a plurality of electronic control units (ECUs) is switched to a sleep status, and switching to a wake-up status according to a request of a telematics terminal, collecting vehicle status information and returning the vehicle status information; and the telematics terminal requesting vehicle status information by transmitting an alive request signal when the sleep indicator signal occurs by monitoring the integrated ECU, and outputting the returned vehicle status information.

The integrated ECU transmits the sleep indicator signal to the telematics terminal when a body Controller Area Network (CAN) connected to the plurality of ECUs is switched to the sleep status after an ignition is turned off or an accessary power is turned off, and the integrated ECU switches the body CAN to the wake-up status when receiving the alive request signal.

The telematics terminal transmits the vehicle status information to a telematics service server so that the vehicle status information is updated to the latest status with the corresponding update date and time.

The telematics terminal transmits the vehicle status information to a telematics service server so that the vehicle status information is transmitted to a user's mobile communication terminal.

When receiving vehicle status information including a door lock status from the integrated ECU since the vehicle receives a door lock signal from a near field communication terminal, the telematics terminal immediately transmits the received door lock status to the telematics service server.

The telematics terminal changes a vehicle status flag value according to whether the vehicle status information is transmitted to the telematics service server or not, and when receiving the sleep indicator signal, the telematics terminal determines whether to transmit the alive request signal to the integrated ECU based on the vehicle status flag value.

When not transmitting the alive request signal after receiving the sleep indicator signal, the telematics terminal initializes the vehicle status flag value.

When the body CAN connected to the plurality of controllers is switched to the wake-up status from the sleep status, the integrated ECU collects the vehicle status information and transmits the vehicle status information to the telematics terminal so that the vehicle status information is additionally updated.

The vehicle status information may include at least one of door status, hood status, trunk status, sun roof status, and window status.

In accordance with one aspect of the present invention, a vehicle status monitoring system may include a vehicle, when a body Controller Area Network (CAN) connected to a plurality of electronics control units (ECUs) is switched to a sleep status, re-switching to a wake-up status and collecting and outputting vehicle status information; and a telematics service server updating the vehicle status information, which is transmitted from the vehicle, to the latest status with the corresponding update date and time, and providing the vehicle status information to a mobile communication terminal.

The vehicle status monitoring system may further include: the mobile communication terminal having an application providing the vehicle status information to execute the application according to a user's request to provide the vehicle status information in the latest status.

The vehicle may include an integrated electronic control unit (ECU) outputting a sleep indicator signal when the plurality of electronic control devices (ECUs) is switched to the sleep status, and switching to the wake-up status according to a request of a telematics terminal, collecting vehicle status information and returning the vehicle status information; and the telematics terminal requesting vehicle status information by transmitting an alive request signal when the sleep indicator signal occurs by monitoring the integrated ECU, and transmitting the returned vehicle status information to the telematics service server.

The integrated ECU transmits the sleep indicator signal to the telematics terminal when the body CAN connected to the plurality of ECUs is switched to the sleep status after an ignition is turned off or an accessary power is tuned off, and the integrated ECU switches the body CAN to the wake-up status when receiving the alive request signal.

When receiving vehicle status information including a door lock status, from the integrated ECU since the vehicle receives a door lock signal from a near field communication terminal, the telematics terminal immediately transmits the received door lock status to the telematics service server.

The telematics terminal changes a vehicle status flag value according to whether the vehicle status information is transmitted to the telematics service server or not, and when receiving the sleep indicator signal, the telematics terminal determines whether to transmit the alive request signal to the integrated ECU based on the vehicle status flag value.

When not transmitting the alive request signal after receiving the sleep indicator signal, the telematics terminal initializes the vehicle status flag value.

When the body CAN connected to the plurality of ECUs is switched to the wake-up status from the sleep status, the integrated ECU collects the vehicle status information and transmits the vehicle status information to the telematics terminal so that the vehicle status information is additionally updated.

The telematics service server allows the vehicle status information, which needs the vehicle control among the vehicle status information, to be output together with a related vehicle control input item, via the mobile communication terminal and the telematics service server transmits the vehicle status information transmitted by the user, to the vehicle so that the vehicle control is performed.

The vehicle status monitoring system may further include: a content provision server providing living information including weather information, wherein when providing the vehicle status information to the mobile communication terminal, the telematics service server provides weather information related to the vehicle status information or weather information and vehicle control input item related to the vehicle status information.

The vehicle status information may include at least one of door status, hood status, trunk status, sun roof status, and window status.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
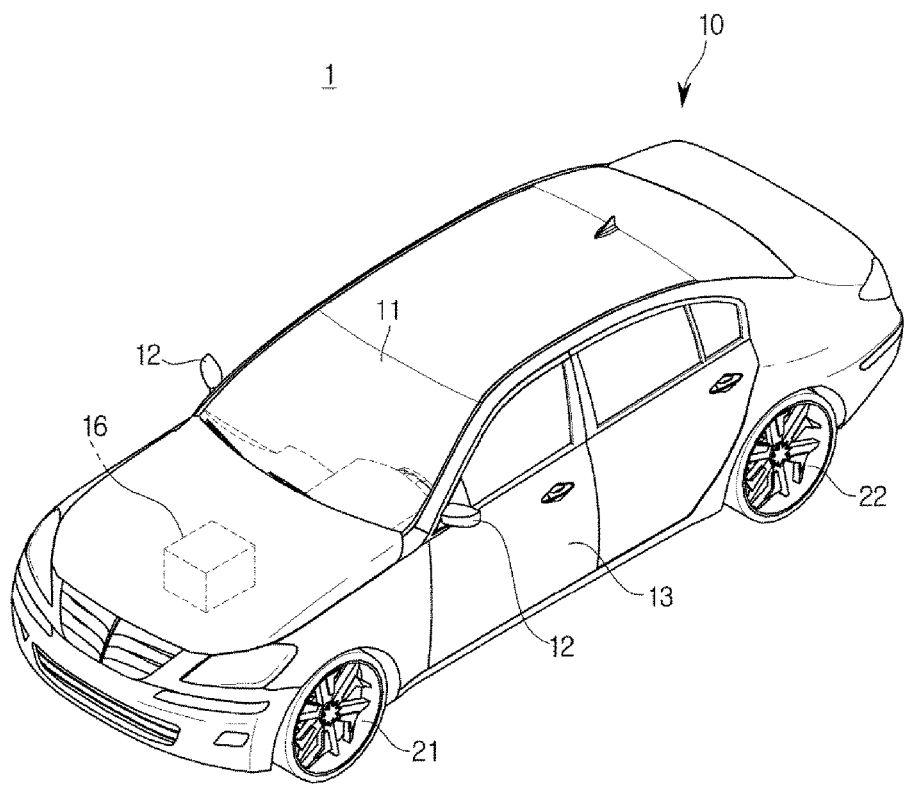
FIG. 1 illustrates an external view of a vehicle.
Figure 1:
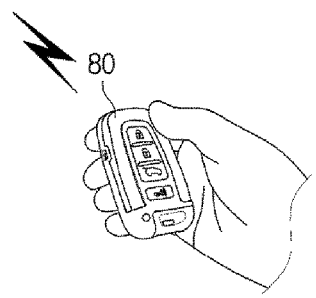

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Like reference numerals refer to like elements throughout the description. Well-known functions or constructions are not described in detail since they would obscure the one or more exemplar embodiments with unnecessary detail. Terms including "unit", "module", "member" and "block" may be embodied as hardware or software. According to embodiments, a plurality of "unit", "module", "member" and "block" may be implemented as a single component or a single "unit", "module", "member" and "block" may include a plurality of components.

It will be understood that when an element is referred to as being "connected" another element, it can be directly or indirectly connected to the other element, wherein the indirect connection includes "connection via a wireless communication network".

Further, when a part "includes" or "comprises" an element, unless there is a particular description contrary thereto, the part may further include other elements, not excluding the other elements.

It will be understood that, although the terms first, second, third, etc., may be used herein to describe various elements, but elements are not limited by these terms.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the present invention, examples of which are illustrated in the accompanying drawings.

FIG. 1 illustrates an external view of a vehicle.

Referring to FIG. 1, a vehicle 1 includes a body 10 forming an external of the vehicle 1, a windscreen 11 providing a front view of the vehicle 1 to a driver, a side mirror 12 providing a view of a rear side of the vehicle 1 to the driver, a door 13 closing the inside of the vehicle 1 from the outside, and vehicle wheels 21 and 22 moving the vehicle 1 by including a front wheel 21 disposed on a front side of the vehicle and a rear wheel 22 disposed on a rear side of the vehicle.

The windscreen 11 may be provided on an upper portion of the front of the body 10 to allow the driver within the vehicle 1 to acquire visual information related to the front of the vehicle 1. The side mirror 12 may include a left side mirror provided on the left side of the body 10 and a right side mirror provided on the right side of the body 10, and may allow the driver inside the vehicle 1 to acquire visual information related to the lateral side and the rear side of the vehicle 1.

The door 13 may be pivotally disposed on a right side and a left side of the body 10. When the door 13 is opened, a driver may be allowed to be accommodated in the vehicle 1, and when the door 13 is closed, the inside of the vehicle 1 may be closed from the outside.

In addition to the above mentioned components, the vehicle 1 may include a driving device 16 configured to rotate the vehicle wheels 21 and 22, a steering system configured to change the driving direction of the vehicle 1, and a brake system configured to stop the driving of the vehicle wheels.

The driving device 16 may supply a torque to the front wheel 21 or the rear wheel 22 so that the body 10 may be moved back and forth. The driving device 16 may include an engine generating a torque by burning the fossil fuel or a motor configured to generate a torque by receiving the power from a battery.

The steering system may include a steering wheel 42 (refer to FIG. 2) receiving a driving direction from a driver, a steering gear changing a rotary motion of the steering wheel 42 to a reciprocating motion, and a steering linkage delivering the reciprocating motion of the steering gear to the front wheel 21. Accordingly, the steering system may change the driving direction of the vehicle 1 by changing the direction of the rotary axis of the wheels.

The brake system may include a brake pedal receiving a brake operation from a driver, a brake drum coupled to the wheels 21 and 22, and a brake shoe stopping the rotation of the brake drum by use of friction force. Accordingly, the brake system may stop the driving of the vehicle 1 by stopping the rotation of the wheels 21 and 22.

Figure 2:
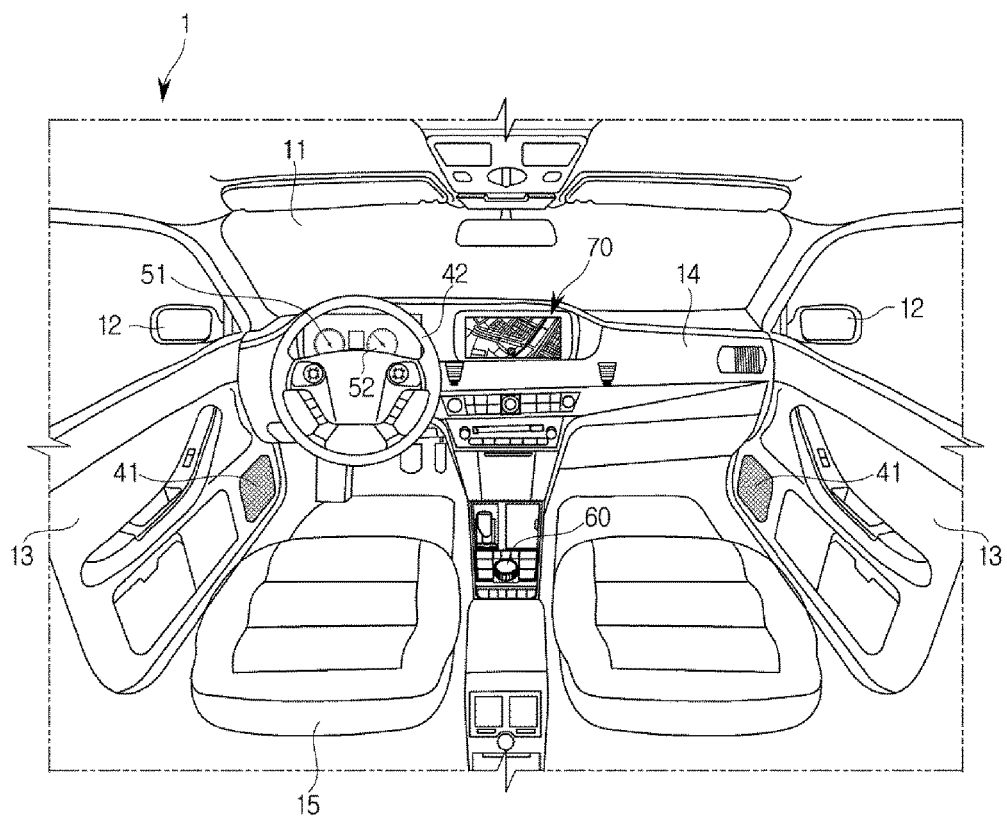
FIG. 2 is a view of an internal of the vehicle.

FIG. 2 is a view of an internal of the vehicle.

The internal of the vehicle 1 may include a dashboard 14 in which a variety of devices are disposed to allow a driver to operate the vehicle 1, a driver seat 15 in which the driver is accommodated, a cluster display 51 and 52 configured to display operation information related to the vehicle 1, and a telematics terminal 70 configured to perform an audio function and a video function as well as a route guidance function providing route guidance information in response to an operation command of the driver.

The dashboard 14 may protrude from a lower side of the windscreen 11 to the driver so that the driver may operate a variety of devices disposed in the dashboard 14 while staring ahead.

The driver seat 15 may be provided in a rear side of the dashboard 14 so that the driver may drive the vehicle 1 in a stable position while staring at the front and the variety of devices of the dashboard 14.

The cluster display 51 and 52 may be provided in the driver seat 15 of the dashboard 14 and include a speedometer 51 indicating a driving speed of the vehicle 1 and a revolutions per minute (RPM) gauge 52 indicating a rotation speed of a driving device.

The telematics terminal 70 may transmit vehicle status information via the communication with a telematics service server 200 (refer to FIG. 3) as well as providing a route guidance of the navigation system. A description thereof will be described later in detail.

The telematics terminal 70 may include a display displaying road information related to the traveling road of the vehicle 1 or a route to a destination; and a speaker 41 outputting a sound according to an operation command of the driver. In recent, an audio video navigation (AVN) device in which an audio device, a video device and a navigation device are integrally formed has been disposed in a vehicle.

The telematics terminal 70 may be disposed in a center fascia. The center fascia may represent a control panel between a driver seat and a passenger seat in the dash board 14, and may represent a portion in which the dash board 14 and a shift lever are vertically joined. Furthermore, an air conditioning device, a heater controller, a blowing port, a cigar jack, an ashtray, and a cup holder as well as the telematics terminal 70 may be disposed in the center fascia. The center fascia together with a center console may distinguish between the driver seat and the passenger seat.

The vehicle 1 may have an additional jog dial 60 to operate a variety of devices including the telematics terminal 70.

According to an exemplary embodiment of the present invention, the jog dial 60 may perform an operation by being rotated or pressed, and may be provided with a touch pad having a touch recognition are configured to perform a handwriting recognition by use of the user's finger or an additional device having a touch recognition function.

Figure 3:
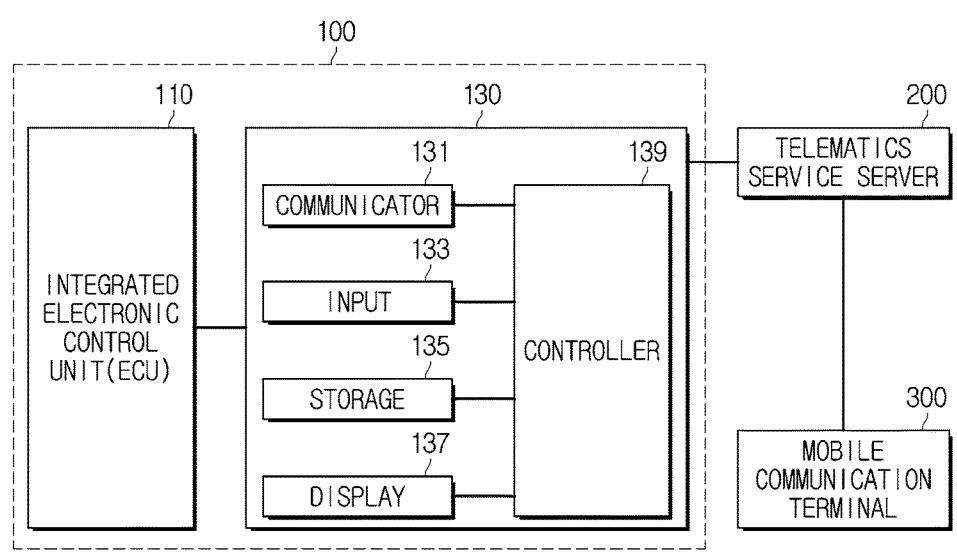
FIG. 3 is a control block diagram illustrating a configuration of the vehicle in details.

FIG. 3 is a control block diagram illustrating a configuration of the vehicle in details.

Figure 4:
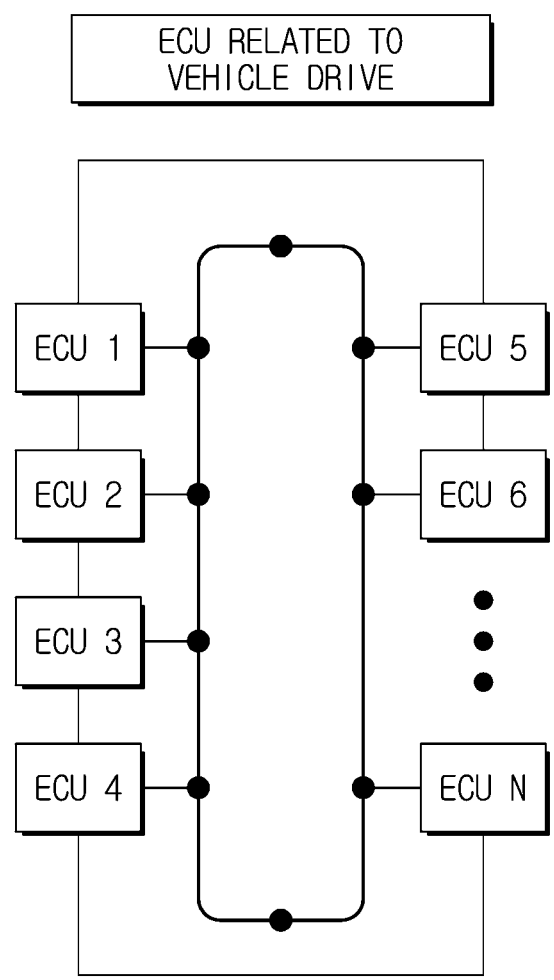
FIG. 4 illustrates a method for collecting vehicle status information.
Figure 5:
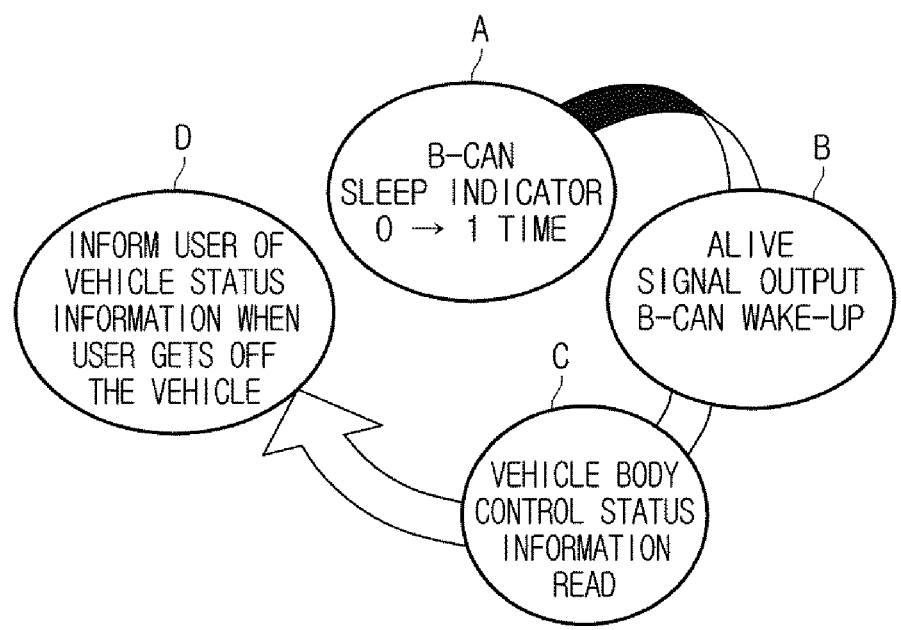
FIG. 5 illustrates schematically a vehicle status monitoring method.

Hereinafter the description will be described with reference to FIG. 4 explaining a method for collecting vehicle status information and FIG. 5 schematically explaining a vehicle status monitoring method.

Referring to FIG. 3, a vehicle 100 may include an integrated electronic control unit (ECU) 110 and a telematics terminal 130. The vehicle 100 may further include another configuration other than the above mentioned configuration, but a detail description of the configuration other than configuration related to the present invention will be omitted.

The integrated ECU 110 may output a sleep indicator signal as a plurality of electronic control units (ECUs) is switched to a sleep status. The integrated ECU 110 may switch the sleep status to a wake-up status in response to the response of the telematics terminal 130 and then collect the vehicle status information. The integrated ECU 110 may return the vehicle status information to the telematics terminal 130. The vehicle status information may include at least one of door status, hood status, trunk status, sun roof status, and window status, but is not limited thereto. That is, the vehicle status information may include all kinds of information related to the vehicle 100 a user should recognize.

As illustrated in FIG. 4, the plurality of ECUs (ECU 1~ECUn) may be connected to a Body Controller Area Network (CAN), and thus when all of the plurality of ECUs is switched to the sleep status, the integrated ECU 110 may transmit the sleep indicator signal to the telematics terminal 130. For example, the integrated ECU 110 may change a sleep indicator signal from 0 (zero) to 1 and then transmit the signal to the telematics terminal 130 (refer to A of FIG. 5).

After the ignition is turned off or the accessary power is turned off, when the body CAN connected to the plurality of ECUs is switched to the sleep status, the integrated ECU 110 may transmit the sleep indicator signal to the telematics terminal 130 and when receiving an alive request signal, the integrated ECU 110 may allow the body CAN to be switched to the wake-up status (refer to B of FIG. 5).

When receiving the alive request signal from the telematics terminal 130, the integrated ECU 110 may wake up the body CAN and collect the vehicle status information from the plurality of ECUs (ECU 1~ECUn) (refer to C of FIG. 5). The integrated ECU 110 may transmit the vehicle status information to the telematics terminal 130 to allow the vehicle status information to be transmitted to a mobile communication terminal 300 of the user (refer to D of FIG. 5).

When the body CAN connected to the plurality of controllers is switched to the wake-up status from the sleep status, the integrated ECU 110 may collect the vehicle status information and transmit the vehicle status information to the telematics terminal 130 so that the vehicle status information is additionally updated. For example, in a state of receiving updated information on the door open status, when the user goes to the vehicle 100 and locks the vehicle 100 or in a normal lock vehicle status, when the user goes to the vehicle 100 and does not lock the vehicle 100, after opening, the body CAN may be woken up. When the body CAN is woken up, the integrated ECU 110 may collect and output the vehicle status information so that the vehicle status information related to the telematics service server 200 is additionally updated.

In a status in which the telematics terminal 130 monitors the integrated ECU 110, when the sleep indicator signal occurs, the telematics terminal 130 may request the vehicle status information by transmitting the alive request signal (refer to B of FIG. 5) and output the returned vehicle status information.

The telematics terminal 130 may include a communicator 131, an input 133, a storage 135, a display 137 and a controller 139.

The communicator 131 may be configured to communicate with an external server as well as the telematics service server 200.

The communicator 131 may include one or more components configured to allow the communication with an external device, wherein the communicator may include at least one of a short range communication module, a wired communication module, and a wireless communication module.

The short-range communication module may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

The wired communication module may include a variety of wired communication module, e.g., Controller Area Network (CAN) communication module, Local Area Network (LAN) module, Wide Area Network (WAN) module, or Value Added Network (VAN) module and a variety of cable communication module, e.g., Universal Serial Bus (USB), High Definition Multimedia Interface (HDMI), Digital Visual Interface (DVI), recommended standard232 (RS-232), or plain old telephone service (POTS).

The wireless communication module may include a wireless communication module supporting a variety of wireless communication methods, e.g., Radio Data System-Traffic Message Channel (RDS-TMC), Digital Multimedia Broadcasting (DMB), Wifi module, Wireless broadband module, global System for Mobile (GSM) Communication, Code Division Multiple Access (CDMA), Wideband Code Division Multiple Access (WCDMA), Time Division Multiple Access (TDMA), and Long Term Evolution (LTE).

The wireless communication module may include a wireless communication interface having an antenna and a receiver that receive traffic information signals. Furthermore, the wireless communication module may further include a traffic information signal conversion module for demodulating an analogy wireless signal received via the wireless communication interface, into a digital control signal.

The communication device may further include an internal communication module for the communication among the electronic devices in the vehicle 100. The internal communication protocol of the vehicle 100 may include Controller Area Network (CAN), Local Interconnection Network (LIN), FlexRay, or Ethernet.

The input 133 may include hardware type devices, e.g., a variety of buttons, switches, pedals, keyboards, mouse, track-balls, a variety levers, handles and sticks, for the input by a user.

The input 133 may include software type devices, e.g., Graphical User interface (GUI) including a touch pad for the input by a user. The touch pad may be implemented by Touch Screen Panel (TSP) and thus the touch pad may have a layer structure with the display 137.

The storage 135 may store a variety of information related to the telematics terminal 130.

The storage 135 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the storage is not limited thereto. The storage 135 may be a memory which is implemented by a separate memory chip from the aforementioned processor related to the controller 139 or the storage may be implemented by a single chip with a processor.

The display 137 may display the information related to the telematics terminal 130 so that the user checks the information.

The display 137 may be implemented by Cathode Ray Tube (CRT), Digital Light Processing (DLP) panel, Plasma Display Penal, Liquid Crystal Display (LCD) panel, Electro Luminescence (EL) panel, Electrophoretic Display (EPD) panel, Electrochromic Display (ECD) panel, Light Emitting Diode (LED) panel or Organic Light Emitting Diode (OLED) panel. The implementation of the display is not limited thereto.

The controller 139 may be configured to control components provided in the telematics terminal 130 to realize the operation of the telematics terminal 130 described later.

The controller 139 may be implemented using a memory storing an algorithm for controlling an operation of components in the vehicle 100 and data related to programs implementing the algorithm, and a processor performing the above mentioned operation using the data stored in the memory. The memory and the processor may be implemented in separate chips, or a single chip.

In a status in which the telematics terminal 130 monitors the sleep indicator signal, when the sleep indicator signal is changed from 0 (zero) to 1, the telematics terminal 130 may output the alive request signal (e.g., B-CAN Alive signal).

The telematics terminal 130 may transmit the vehicle status information to the telematics service server 200 so that the vehicle status information is updated to the latest status with the update date and time.

The telematics terminal 130 may transmit the vehicle status information to the telematics service server 200 so that the vehicle status information is transmitted to the user's mobile communication terminal 300.

When the vehicle 100 receives a door lock signal from a near field communication terminal 80 (refer to FIG. 1), the telematics terminal 130 may receive the vehicle status information including the door lock status from the integrated ECU 110 and then immediately transmit the received door lock status to the telematics service server 200. The near field communication terminal may represent a terminal configured to turn on or off the remote starting of the vehicle 100 via the short range communication with the vehicle 100, e.g., a smart key, and a fob key.

A predetermined time period (e.g., 4 minutes) may be taken from when the ignition is turned off or the accessary power is turned off since the user gets off the vehicle, until the sleep indicator signal is output since the plurality of ECUs (ECU1~ECUn of FIG. 4) is switched to the sleep status.

When the vehicle 100 is in the door lock status by the door lock signal actively transmitted from the near field communication terminal 80, the integrated ECU 110 may immediately transmit the vehicle status information to the telematics terminal 130 without waiting until all of the plurality of ECUs is switched to the sleep status, so that the user rapidly receive the vehicle status information according to the case in which the user gets off the vehicle The telematics terminal 130 may transmit the vehicle status information to the telematics service server 200 to allow the user to verify the vehicle status information via the mobile communication terminal 300. In the present time, a method for providing the vehicle status information via the mobile communication terminal 300 may include a method of providing the vehicle status information, which is updated to the latest status by the telematics service server 200, by executing an application according to a user's selection, and a method of displaying the vehicle status information on a screen of the mobile communication terminal 300 in a pop-up form to allow the user to verify the vehicle status information although the user does not execute the application of the mobile communication terminal 300, but is not limited thereto. The vehicle status information provision method may vary according to the need of the operator.

The telematics terminal 130 may change a vehicle status flag value according to whether the vehicle status information is transmitted to the telematics service server 200 or not, and when receiving the sleep indicator signal, the telematics terminal 130 may determine whether to transmit the alive request signal to the integrated ECU 110 based on the vehicle status flag value.

The telematics terminal 130 may manage the vehicle status flag value by changing the vehicle status flag value according to whether the vehicle status information is transmitted to the telematics service server 200 or not. When the ignition is turned off or the accessary power is turned off, or when the telematics terminal 130 receives the sleep indicator signal, which is transmitted when the vehicle is switched to the door lock status by the near field communication terminal, the telematics terminal 130 may verify the vehicle status flag and then determine whether to transmit the alive request signal to the integrated ECU 110.

Since the integrated ECU 110 is switched to the wake-up status to transmit the vehicle status information to the telematics terminal 130 and then switched to the sleep status, the sleep indicator signal may occur again. Since the telematics terminal 130 receives the sleep indicator signal from the integrated ECU 110 and then outputs the alive request signal, again, the unnecessary alive request signal may be repeatedly generated. According to various aspects of the present invention, the telematics terminal 130 may prevent the generation of the unnecessary alive request signal in advance by managing the vehicle status flag value.

When not transmitting the alive request signal after receiving the sleep indicator signal, the telematics terminal 130 may initialize the vehicle status flag value.

For example, the telematics terminal 130 may manage a vehicle status flag initial value as "Vehicle Status Flag=0" and when transmitting the vehicle status information to the telematics service server 200, the telematics terminal 130 may manage the vehicle status flag value by changing "Vehicle Status Flag=0" to "Vehicle Status Flag=1". In a status of receiving the sleep indicator signal, when the vehicle status flag value is 0 (zero), the telematics terminal 130 may output the alive request signal, and when the vehicle status flag value is 1 the telematics terminal 130 may not output the alive request signal. In the present time, when not transmitting the alive request signal after receiving the sleep indicator signal, the telematics terminal 130 may initialize the vehicle status flag value, again and thus when receiving the sleep indicator signal, again, the telematics terminal 130 may allow the vehicle status information to be updated.

Figure 6:
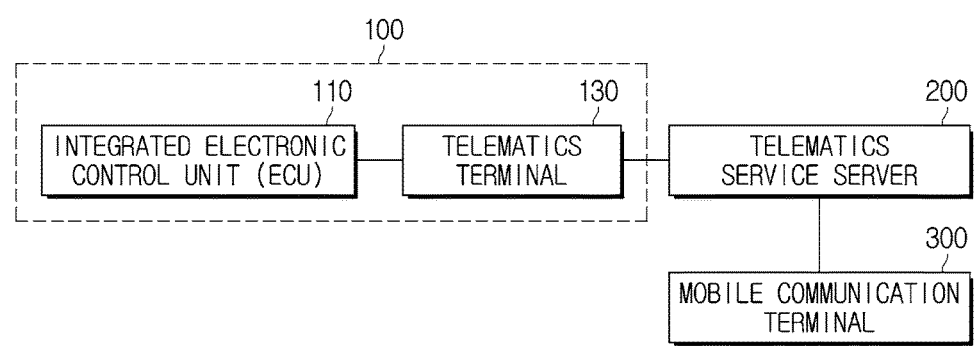
FIG. 6 is a control block diagram illustrating an exemplary embodiment of a vehicle status monitoring system.

FIG. 6 is a control block diagram illustrating an exemplary embodiment of a vehicle status monitoring system.

Figure 7:
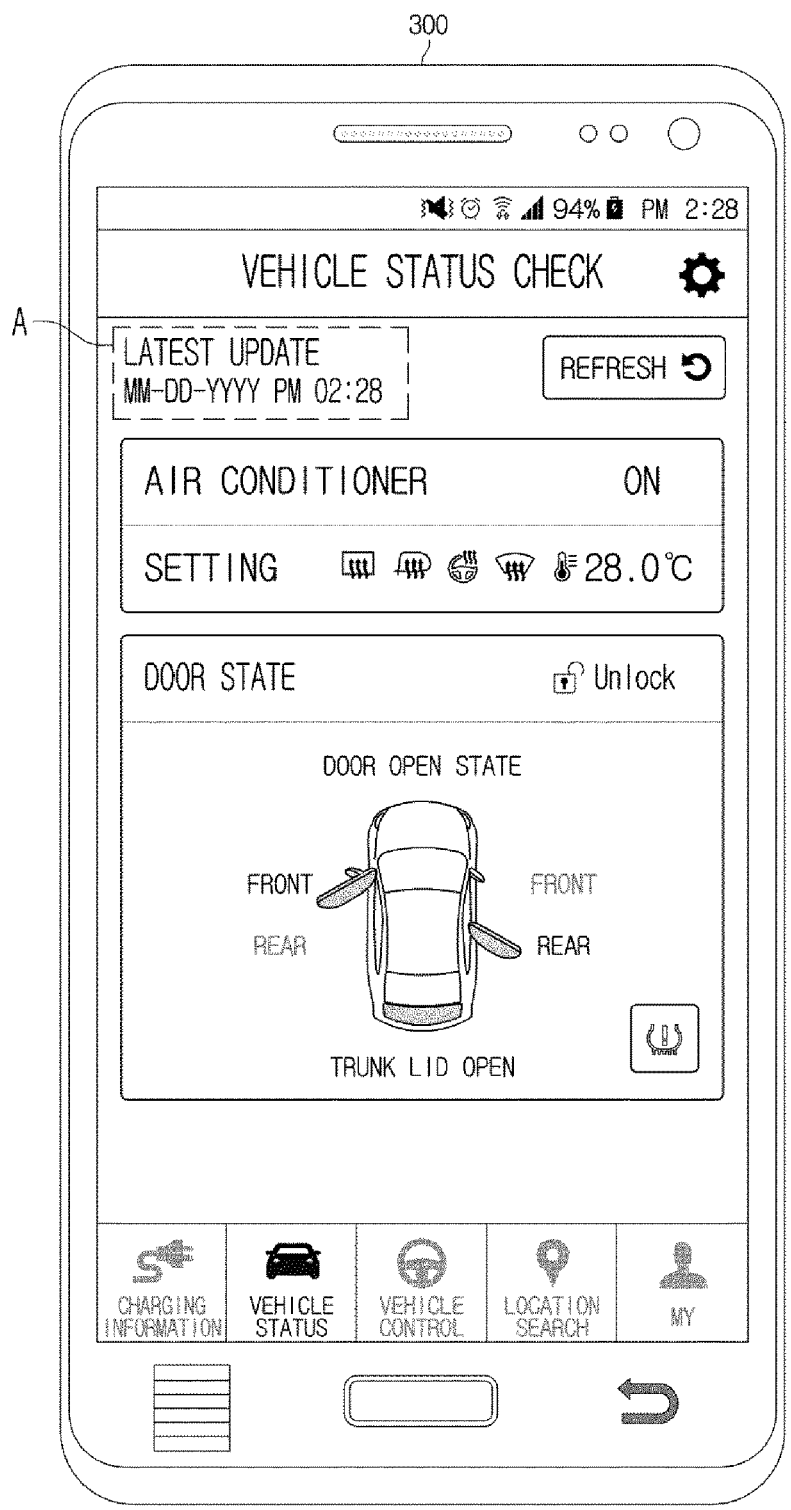
FIG. 7 is illustrating an exemplary embodiment of providing the vehicle status information via the mobile communication terminal.

Hereinafter a description will be described with reference to FIG. 7 illustrating an exemplary embodiment of providing the vehicle status information via the mobile communication terminal.

As illustrated in FIG. 6, a vehicle status monitoring system may include the vehicle 100, the telematics service server 200 and the mobile communication terminal 300.

When the body CAN connected to the plurality of ECUs is switched to the sleep status, the vehicle 100 may re-switch the sleep status to the wake-up status and collect and output the vehicle status information. The vehicle status information may include at least one of door status, hood status, trunk status, sun roof status, and window status, but is not limited thereto. That is, the vehicle status information may include all kinds of information related to the vehicle 100 a user should recognize.

The vehicle 100 may include the integrated ECU 110 and the telematics terminal 130.

The integrated ECU 110 may output the sleep indicator signal as the plurality of ECUs is switched to the sleep status. The integrated ECU 110 may switch the sleep status to the wake-up status in response to the response of the telematics terminal 130 and then collect the vehicle status information. The integrated ECU 110 may return the vehicle status information to the telematics terminal 130.

After the ignition is turned off or the accessary power is turned off, when the body CAN connected to the plurality of ECUs is switched to the sleep status, the integrated ECU 110 may transmit the sleep indicator signal to the telematics terminal 130 and when receiving the alive request signal, the integrated ECU 110 may switch the body CAN to the wake-up status.

When the body CAN connected to the plurality of ECUs is switched to the wake-up status from the sleep status, the integrated ECU 110 may collect the vehicle status information and transmit the vehicle status information to the telematics terminal 130 so that the vehicle status information is additionally updated.

In a state in which the telematics terminal 130 monitors the integrated ECU 110, when the sleep indicator signal occurs, the telematics terminal 130 may request the vehicle status information by transmitting the alive request signal and transmit the returned vehicle status information to the telematics service server 200.

In a state in which the telematics terminal 130 monitors the sleep indicator signal, when the sleep indicator signal is changed from 0 (zero) to 1, the telematics terminal 130 may output the alive request signal (e.g., B-CAN Alive signal). In the present time, "sleep indicator signal=0 (zero)" may represent the wake-up status and "sleep indicator signal=1" may represent the sleep indication status in which all of the plurality of ECUs is switched to the sleep status.

When the vehicle 100 receives the door lock signal from the near field communication terminal 80 (refer to FIG. 1), the telematics terminal 130 may receive the vehicle status information including the door lock status from the integrated ECU 110 and then immediately transmit the received door lock status to the telematics service server 200.

The telematics terminal 130 may change the vehicle status flag value according to whether the vehicle status information is transmitted to the telematics service server 200 or not, and when receiving the sleep indicator signal, the telematics terminal 130 may determine whether to transmit the alive request signal to the integrated ECU 110 based on the vehicle status flag value.

The telematics terminal 130 may manage the vehicle status flag value by changing the vehicle status flag value according to whether the vehicle status information is transmitted to the telematics service server 200 or not. When the ignition is turned off or the accessary power is turned off, or when the telematics terminal 130 receives the sleep indicator signal, which is transmitted when the vehicle is switched to the door lock status by the near field communication terminal, the telematics terminal 130 may verify the vehicle status flag and then determine whether to transmit the alive request signal to the integrated ECU 110.

For example, the vehicle status flag value may include 0 (zero: Vehicle Status Flag=0) indicating an initial value and 1 (Vehicle Status Flag=1) indicating of transmitting the vehicle status information to the telematics service server 200, already. That is, the telematics terminal 130 may mange the vehicle status flag value by changing the vehicle status flag value to 0 (zero) or 1 according to whether the vehicle status information is transmitted.

When not transmitting the alive request signal after receiving the sleep indicator signal, the telematics terminal 130 may initialize the vehicle status flag value.

Meanwhile, when the telematics terminal 130 does not transmit the alive request signal to the integrated ECU 110 after checking the vehicle status flag value, the plurality of ECUs (ECU1~ECUn of FIG. 4) may maintain the complete sleep status without switching to the unnecessary wake up status, and thus it may be possible to prevent the dark current. That is, according to various aspects of the present invention, in a state in which the ignition is turned off or the accessary power is turned off, it may be possible to switch the status of the plurality of ECUs to the wake-up status only when it is needed to collect the vehicle status information, and it may be possible to maintain the complete sleep status in other cases. Therefore, it may be possible to prevent the generation of the unnecessary dark current.

The telematics terminal 130 may initialize the vehicle status flag value and thus when receiving the sleep indicator signal, again, the telematics terminal 130 may transmit the alive request signal to the integrated ECU 110.

The telematics service server 200 may update the vehicle status information transmitted from the vehicle 100, with the corresponding update date and time, to the latest status, and the telematics service server 200 may provide the vehicle status information to the mobile communication terminal 300. Since the telematics service server 200 always store the latest vehicle status information and immediately provide the vehicle status information to the user's mobile communication terminal 300, it may be possible to improve the user convenience.

The mobile communication terminal 300 may include an application for providing the vehicle status information. The mobile communication terminal 300 may execute the application in response to the user to provide the latest vehicle status information. In the present time, the vehicle status information may be in the latest update status stored by the telematics service server 200.

As illustrated in FIG. 7, the mobile communication terminal 300 may display the vehicle status information on the screen to allow the user to verify the vehicle status information, wherein the vehicle status information is stored with the update date and time (A of FIG. 7) by the telematics service server 200.

Referring to FIG. 7, the vehicle status information may include the door status and the trunk status, but is not limited thereto. The vehicle status information may include all kinds of information related to the vehicle 100, a user should recognize, as well as the hood status, trunk status, sun roof status, and window status.

Figure 8:
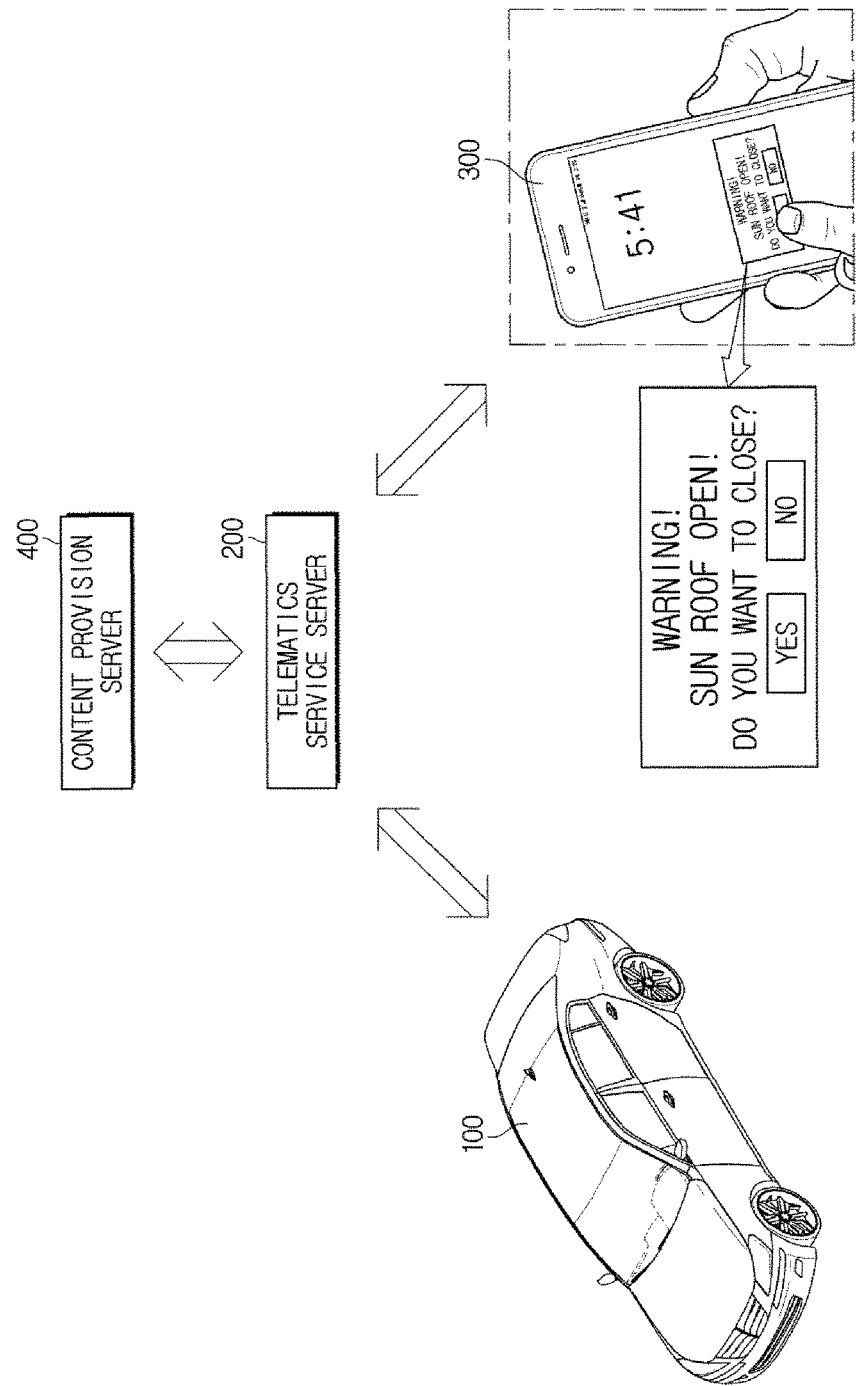
FIG. 8 is a view illustrating a vehicle status monitoring system In accordance with various exemplary embodiments of the present invention.

FIG. 8 is a view illustrating a vehicle status monitoring system In accordance with various exemplary embodiments of the present invention.

Hereinafter a description of the same configuration as those shown in FIG. 6 will be omitted and it is understood that all of the techniques included in FIG. 6 may be implemented for the same configuration.

Referring to FIG. 8, the vehicle status monitoring system may include the vehicle 100, the telematics service server 200, the mobile communication terminal 300 and a content provision server 400.

When the body CAN connected to the plurality of ECUs is switched to the sleep status, the vehicle 100 may re-switch the sleep status to the wake-up status and collect and output the vehicle status information.

The telematics service server 200 may update the vehicle status information transmitted from the vehicle 100 to the latest vehicle status information with the update date and time, and transmit the latest vehicle status information to the mobile communication terminal 300.

The telematics service server 200 may allow the vehicle status information, which needs the vehicle control among the vehicle status information, to be output together with a related vehicle control input item, via the mobile communication terminal 300. The telematics service server 200 may transmit the vehicle status information transmitted by the user, to the vehicle 100 so that the vehicle control is performed.

As illustrated in FIG. 8, the telematics service server 200 may allow the mobile communication terminal 300 to display a guide text including "Warning! Sun roof open, Do you want to close?" and display a selection item "Yes/No"

When providing the vehicle status information to the mobile communication terminal 300, the telematics service server 200 may provide further weather information related to the vehicle status information or weather information and vehicle control input item related to the vehicle status information.

For example, the telematics service server 200 may allow the mobile communication terminal 300 to display a guide text including "Sun roof open, it is raining in the current region", and "Sun roof open, it is raining in the current region, do you want to close the sun roof?" and display a selection item "yes/no"

The mobile communication terminal 300 may include an application for providing the vehicle status information. The mobile communication terminal 300 may execute the application in response to the user to receive the latest vehicle status information.

The content provision server 400 may provide living information as well as weather information, but is not limited thereto.

As is apparent from the above description, according to the provided vehicle status monitoring system and a vehicle, it may be possible to rapidly provide the vehicle status information upon the user's request, by maintaining the latest update status by actively collecting the vehicle status information by monitoring a point of time when the user gets off the vehicle.

It may be possible to provide the vehicle status in real time to the user's mobile communication terminal by monitoring the vehicle status, improving the user convenience.

It may be possible to maintain the vehicle status in the sleep status except when the vehicle status collection time, and thus it may be possible to prevent the consumption of the dark current of the vehicle.

The disclosed exemplary embodiments may be implemented as a recording medium storing a command executable by a computer. The command may be stored in the program code type. When executed by the processor, a program module may be generated and perform the disclosed exemplary embodiments. The recording medium may be implemented as a computer readable recording medium.

The disclosed exemplary embodiments may be implemented as a computer code on a computer readable recording medium. The computer readable recording medium may include various recording medium stored data decrypted by the computer system. For example, there may be a Read Only Memory (ROM), a Random Access Memory (RAM), a magnetic tape, a magnetic disk, a flash memory, and an optical data storage device For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle comprising:
an integrated electronic control unit (ECU) outputting a sleep indicator signal when a plurality of electronic control units (ECUs) is switched to a sleep status, and switching to a wake-up status according to a request of a telematics terminal, collecting vehicle status information and returning the vehicle status information; and
the telematics terminal requesting the vehicle status information by transmitting an alive request signal when the sleep indicator signal occurs by monitoring the integrated ECU, and outputting the returned vehicle status information.

2. The vehicle of claim 1, wherein the integrated ECU transmits the sleep indicator signal to the telematics terminal when a body Controller Area Network (CAN) connected to the plurality of ECUs is switched to the sleep status after an ignition is turned off or an accessary power is tuned off, and the integrated ECU switches the body CAN to the wake-up status when receiving the alive request signal.

3. The vehicle of claim 1, wherein the telematics terminal transmits the vehicle status information to a telematics service server so that the vehicle status information is updated to a latest status with a corresponding update date and time.

4. The vehicle of claim 1, wherein the telematics terminal transmits the vehicle status information to a telematics service server so that the vehicle status information is transmitted to a user's mobile communication terminal.

5. The vehicle of claim 1, wherein when receiving the vehicle status information including a door lock status from the integrated ECU since the vehicle receives a door lock signal from a near field communication terminal, the telematics terminal transmits the received door lock status to the telematics service server.

6. The vehicle of claim 1, wherein the telematics terminal changes a vehicle status flag value according to whether the vehicle status information is transmitted to the telematics service server or not, and when receiving the sleep indicator signal, the telematics terminal determines whether to transmit the alive request signal to the integrated ECU based on the vehicle status flag value.

7. The vehicle of claim 6, wherein when not transmitting the alive request signal after receiving the sleep indicator signal, the telematics terminal initializes the vehicle status flag value.

8. The vehicle of claim 1, wherein when the body CAN connected to the plurality of controllers is switched to the wake-up status from the sleep status, the integrated ECU collects the vehicle status information and transmits the vehicle status information to the telematics terminal so that the vehicle status information is additionally updated.

9. The vehicle of claim 1, wherein the vehicle status information includes at least one of door status, hood status, trunk status, sun roof status, and window status.

10. A vehicle status monitoring system comprising:
a vehicle, when a body Controller Area Network (CAN) connected to a plurality of electronics control units (ECUs) is switched to a sleep status, re-switching to a wake-up status and collecting and outputting vehicle status information; and a telematics service server updating the vehicle status information, which is transmitted from the vehicle, to a latest status with a corresponding update date and time, and providing the vehicle status information to a mobile communication terminal.

11. The vehicle status monitoring system of claim 10, further including:

the mobile communication terminal having an application providing the vehicle status information to execute the application according to a user's request to provide the vehicle status information in the latest status.

12. The vehicle status monitoring system of claim 10, wherein the vehicle includes an integrated electronic control unit (ECU) outputting a sleep indicator signal when the plurality of electronic control units (ECUs) is switched to the sleep status, and switching to the wake-up status according to a request of a telematics terminal, collecting the vehicle status information and returning the vehicle status information; and wherein the telematics terminal requesting the vehicle status information by transmitting an alive request signal when the sleep indicator signal occurs by monitoring the integrated ECU, and transmitting the returned vehicle status information to the telematics service server.

13. The vehicle status monitoring system of claim 12, wherein the integrated ECU transmits the sleep indicator signal to the telematics terminal when the body CAN connected to the plurality of ECUs is switched to the sleep status after an ignition is turned off or an accessary power is tuned off, and the integrated ECU switches the body CAN to the wake-up status when receiving the alive request signal.

14. The vehicle status monitoring system of claim 12, wherein when receiving the vehicle status information including a door lock status, from the integrated ECU since the vehicle receives a door lock signal from a near field communication terminal, the telematics terminal transmits the received door lock status to the telematics service server.

15. The vehicle status monitoring system of claim 12, wherein the telematics terminal changes a vehicle status flag value according to whether the vehicle status information is transmitted to the telematics service server or not, and when receiving the sleep indicator signal, the telematics terminal determines whether to transmit the alive request signal to the integrated ECU based on the vehicle status flag value.

16. The vehicle status monitoring system of claim 15, wherein when not transmitting the alive request signal after receiving the sleep indicator signal, the telematics terminal initializes the vehicle status flag value.

17. The vehicle status monitoring system of claim 12, wherein when the body CAN connected to the plurality of ECUs is switched to the wake-up status from the sleep status, the integrated ECU collects the vehicle status information and transmits the vehicle status information to the telematics terminal so that the vehicle status information is additionally updated.

18. The vehicle status monitoring system of claim 10, wherein the telematics service server allows the vehicle status information, which needs the vehicle control among the vehicle status information, to be output together with a related vehicle control input item, via the mobile communication terminal and the telematics service server transmits the vehicle status information transmitted by a user, to the vehicle so that the vehicle control is performed.

19. The vehicle status monitoring system of claim 10, further including:

a content provision server providing living information including weather information, wherein when providing the vehicle status information to the mobile communication terminal, the telematics service server provides weather information related to the vehicle status information or weather information and vehicle control input item related to the vehicle status information.

20. The vehicle status monitoring system of claim 10, wherein the vehicle status information includes at least one of door status, hood status, trunk status, sun roof status, and window status.

* * * * *